(12) United States Patent
Kazmierczak et al.

(10) Patent No.: US 11,194,052 B1
(45) Date of Patent: Dec. 7, 2021

(54) SYSTEMS AND METHODS FOR REAL-TIME GNSS INTERFERENCE MONITORING

(71) Applicant: Rockwell Collins, Inc., Cedar Rapids, IA (US)

(72) Inventors: Jeremy R. Kazmierczak, Rockledge, FL (US); Angelo J. Joseph, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 175 days.

(21) Appl. No.: 16/118,045

(22) Filed: Aug. 30, 2018

(51) Int. Cl.
*G01S 19/21* (2010.01)
(52) U.S. Cl.
CPC .................................. *G01S 19/215* (2013.01)
(58) Field of Classification Search
CPC .......... G01S 19/215; G01S 19/21; G01S 19/24
See application file for complete search history.

(56) References Cited

U.S. PATENT DOCUMENTS

| | | | | |
|---|---|---|---|---|
| 2011/0227787 A1* | 9/2011 | Gum | ..................... | G01S 5/0215 342/357.28 |
| 2015/0116148 A1* | 4/2015 | Kim | ..................... | G01S 19/215 342/357.59 |
| 2016/0124092 A1* | 5/2016 | McDonald | ............. | G01S 19/21 342/13 |
| 2017/0297737 A1* | 10/2017 | Arnold | .................... | G01S 19/15 |
| 2019/0129041 A1* | 5/2019 | Lyusin | .................. | G01S 19/215 |
| 2019/0154839 A1* | 5/2019 | Ashjaee | ................. | G01S 19/28 |
| 2019/0235086 A1* | 8/2019 | Meng | .................. | G05D 1/0278 |
| 2020/0166601 A1* | 5/2020 | Chen | .................. | H04W 72/042 |

OTHER PUBLICATIONS

EuroControl, "GNSS RFI Source Localization using Flight track Data and support from GNSS Providers", Dec. 4, 2017. 23 pages.

* cited by examiner

*Primary Examiner* — Timothy X Pham
(74) *Attorney, Agent, or Firm* — Suiter Swantz pc llo

(57) ABSTRACT

A system for monitoring GNSS interference and/or spoofing includes a display device, and a receiver device to receive an incoming radio frequency (RF) satellite signal from a satellite vehicle. The receiver device includes a processor, and computer-readable storage media communicably coupled to the processor. The computer-readable storage media has instructions stored thereon that, when executed by the processor, cause the processor to receive an incoming RF signal, determine that the incoming RF signal is unreliable, generate detection data in response to detecting that the incoming RF signal is unreliable, and broadcast the detection data.

12 Claims, 8 Drawing Sheets

SYSTEMS AND METHODS FOR REAL-TIME GNSS INTERFERENCE MONITORING

BACKGROUND

The inventive concepts disclosed herein relate generally to the field of navigation systems. More particularly, embodiments of the inventive concepts disclosed herein relate to systems and methods for real-time GNSS interference monitoring.

Global navigational satellite systems (GNSS) refer to a variety of satellite navigation systems used for providing autonomous geo-spatial positioning. These satellite navigation systems include, for example, the global positioning system (GPS), the Russian global orbiting navigational satellite system (GLONASS), the European satellite navigation system Galileo, the Chinese satellite navigation systems BeiDou, and other global or regional systems. Each satellite navigation system can include a constellation of satellites deployed in orbits around the earth that continuously transmit positioning signals. The constellation of satellites can transmit radio frequency (RF) positioning signals over various frequency bands. For example, GPS satellites can transmit L1-band positioning signals having a center frequency of 1575.42 MHz, L2-band positioning signals with a center frequency of 1227.6 MHz, and L5-band positioning signals with a center frequency of 1176.45 MHz. Distinct frequency bands may be associated with different types of navigation applications, e.g., civil or military navigation.

Generally, GNSS signals are low power and are prone to interference caused from a variety of sources, for example, such as radio emissions, intentional or unintentional jamming, naturally occurring conditions (e.g., space weather, magnetized materials, or the like), government testing, spoofing, or the like. Interference on the GNSS signals can cause difficulties and/or inaccuracies for a GNSS/GPS receiver in determining location information or other navigation data from the GNSS signals. On the other hand, spoofing causes difficulties and/or inaccuracies by masquerading as a GNSS signal, but with false or incorrect navigation data which can cause a GNSS/GPS receiver to calculate false or incorrect location (or position) information. While some current monitoring systems provide notices or advisories containing information concerning various activities that may potentially cause GNSS signal interference or outages, theses notices generally cover a large geographical area over a long timeframe that is too widespread and over-inclusive to be of any particular use. Further, these monitoring systems do not provide any information with regards to spoofing. Accordingly, an interference and/or spoofing monitoring system that can provide more pinpoint accuracy of interference and/or spoofing areas in real-time or near real-time may be desired.

SUMMARY

In one aspect, the inventive concepts disclosed herein are directed to system including a display device and a receiver device. The receiver device is configured to receive an incoming radio frequency (RF) satellite signal from a satellite vehicle, and includes a processor and computer-readable storage media. The computer-readable storage media is communicatively connected to the processor and has instructions stored thereon that, when executed by the processor, cause the processor to receive an incoming RF signal, determine that the incoming RF signal is unreliable, generate detection data in response to detecting that the incoming RF signal is unreliable, and broadcast the detection data.

In some embodiments, the instructions may further cause the processor to detect interference on the incoming RF signal, wherein the incoming RF signal is determined to be unreliable in response to detecting the interference on the incoming RF signal, and update an interference parameter for the detection data in response to detecting the interference, wherein the interference parameter indicates that the interference is detected.

In some embodiments, the instructions may further cause the processor to detect spoofing on the incoming RF signal, wherein the incoming RF signal is determined to be unreliable in response to detecting the spoofing on the incoming RF signal, and update a spoofing parameter for the detection data in response to detecting the interference, wherein the spoofing parameter indicates that the spoofing is detected.

In some embodiments, the instructions may further cause the processor to estimate a current position, and update current position information for the detection data based on the estimated current position.

In some embodiments, the current position may be estimated based on a last known position calculated based on a reliable incoming satellite signal.

In some embodiments, the display device may be configured to display an indicator indicating that the incoming RF signal is unreliable.

In some embodiments, the indicator may be one or more lights indicating the detection of interference and/or spoofing on the incoming RF signal, and the display device may be a pilot display that is configured to display the one or more lights in response to detecting the interference and/or spoofing on the incoming RF signal.

In some embodiments, the instructions may further cause the processor to generate a virtual geofence to surround an area corresponding to the detection data, and the display device may be configured to display the virtual geofence.

In some embodiments, the instructions may further cause the processor to receive detection data from one or more other receiver devices, and adjust the virtual geofence to encompass one or more areas corresponding to the received detection data.

In some embodiments, the display device may be a pilot display or an air traffic control display that may be configured to display the virtual geofence.

In another aspect, the inventive concepts disclosed herein are directed to a method, including receiving, by a receiver device configured to receive an incoming radio frequency (RF) satellite signal from a satellite vehicle, an incoming RF signal; determining, by the receiver device, that the incoming RF signal is unreliable; generating, by the receiver device, detection data in response to detecting that the incoming RF signal is unreliable; and broadcasting, by the receiver device, the detection data.

In some embodiments, the method may further include detecting, by the receiver device, interference on the incoming RF signal, wherein the incoming RF signal is determined to be unreliable in response to detecting the interference on the incoming RF signal, and updating, by the receiver device, an interference parameter for the detection data in response to detecting the interference, wherein the interference parameter indicates that the interference is detected.

In some embodiments, the method may further include detecting, by the receiver device, spoofing on the incoming RF signal, wherein the incoming RF signal is determined to be unreliable in response to detecting the spoofing on the incoming RF signal, and updating, by the receiver device a spoofing parameter for the detection data in response to detecting the interference, wherein the spoofing parameter indicates that the spoofing is detected.

In some embodiments, the method may further include estimating, by the receiver device, a current position, and updating, by the receiver device, current position information for the detection data based on the estimated current position.

In some embodiments, the current position may be estimated based on a last known position calculated based on a reliable incoming satellite signal.

In some embodiments, the method may further include displaying, by a display device coupled to the receiver device, an indicator indicating that the incoming RF signal is unreliable.

In some embodiments, the indicator may be one or more lights indicating the detection of interference and/or spoofing on the incoming RF signal, and the display device may be a pilot display that is configured to display the one or more lights in response to detecting the interference and/or spoofing on the incoming RF signal.

In some embodiments, the method may further include generating, by the receiver device, a virtual geofence to surround an area corresponding to the detection data, and displaying, by a display device coupled to the receiver device, the virtual geofence.

In some embodiments, the method may further include receiving, by the receiver device, detection data from one or more other receiver devices, and adjusting, by the receiver device, the virtual geofence to encompass one or more areas corresponding to the received detection data.

In some embodiments, the display device may be a pilot display or an air traffic control display that may be configured to display the virtual geofence.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
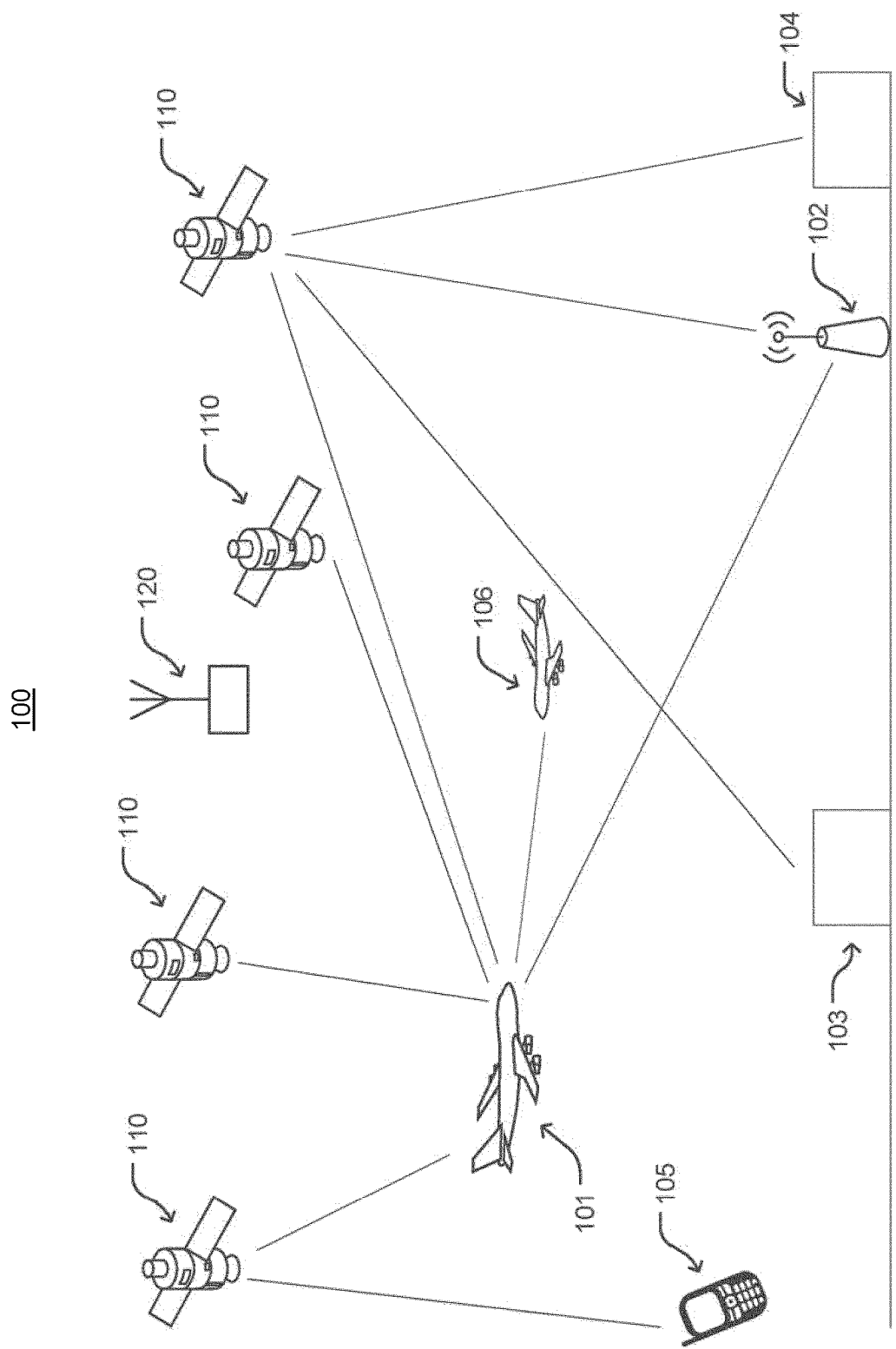
FIG. 1 is a schematic diagram of a communication network for GNSS communications, according to an embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for real-time GNSS interference and/or spoofing monitoring. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, monitor warning systems, and/or the like. While the inventive concepts disclosed herein are described in connection with systems and methods implementable for a platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system, a portable electronic device, a hand-held location tracking device, and/or the like). The systems and methods described herein may be implemented for GPS/GNSS communications, or other signal processing devices, which can monitor for and report the detection of interference and/or spoofing in real-time or near real-time.

In some embodiments, a receiver device includes a radio frequency receiver and one or more processors. The radio frequency receiver is configured to receive an incoming radio frequency (RF) signal, which may include an RF satellite signal from a satellite vehicle. The processors are configured to detect interference on and/or spoofing of the RF satellite signal, generate detection data, and transmit or broadcast the detection data to be received, analyzed, and processed by one or more other platforms (e.g., other aircrafts, ground stations, radar systems, and/or the like). In some embodiments, the processors may cause display of an indication of the detected interference and/or spoofing, for example, on a pilot display. For example, in some embodiments, the processors may cause display of an icon or other indicator to indicate the detection of interference and/or spoofing. In some embodiments, the processors are configured to receive detection data from one or more other platforms (e.g., other aircrafts, ground stations, and/or the like), and may cause display of an indication of the received detection data. For example, in some embodiments, the processors may generate a virtual geofence around an area where the interference and/or spoofing has been detected (e.g., directly and/or via the detection data from one or more other platforms), and may cause display of the virtual geofence or other indicator on an associated display device (e.g., a pilot display). In some embodiments, the detection data from one or more platforms may be used to isolate or identify a location of the source of the interference and/or spoofing.

In some embodiments, the receiver device can be integrated with an airborne platform or other platform as described herein. For example, the systems and methods for GNSS processing described herein can be associated with avionics controllers or other critical electronic devices, such as those in an aircraft cockpit or control center, of the airborne platform. However, the present disclosure is not limited thereto, and in other embodiments, the receiver device can be integrated with a ground-based (e.g., stationary) platform (e.g., a ground station), a mobile ground platform, a maritime platform, a portable electronic device (e.g., handheld device), and/or the like.

Systems manufactured in accordance with the inventive concepts disclosed herein can improve the operations of GNSS receiver hardware (including GPS receiver electronics) and various monitoring and reporting systems, as well as portable electronic devices or aircraft or other airborne platforms including GNSS receiver hardware, by detecting and reporting interference and/or spoofing over a more localized area, in real-time or near real-time, even while experiencing the interference and/or spoofing. Further, various display devices (e.g., pilot displays, flight displays, air traffic control displays, and/or the like) and/or various monitoring and reporting systems (e.g., Notice to Airmen NOTAM, Pilot Reports PIREP, and/or the like) may be improved by providing notice to flight crews, ground control technicians, and/or other interested parties in real-time or near real-time of the areas where interference and/or spoofing is detected, so that various interested parties can use the information to take appropriate actions (e.g., avoid the areas, rely on other sources, devices, and sensors for navigation, identify or isolate the source of the interference and/or spoofing, and/or the like). These improvements can allow for more accurate navigation, targeting, and/or monitoring applications by reporting potential inaccurate or false-positive location determinations caused by the interference and/or spoofing, especially where increased accuracy as compared to typical systems (e.g., accuracy to the centimeter scale) is desired. These improvements can also improve GNSS technologies by allowing for the identification of the location and/or source of the interference and/or spoofing, so that appropriate action can be taken to reduce or eliminate the interference and/or spoofing.

Referring now to FIG. 1, a communication network 100 is shown according to an exemplary embodiment of the inventive concepts disclosed herein. The communication network 100 includes various platforms including an airborne platform 101, a ground-based (e.g., stationary) platform 102, a mobile ground platform 103, a maritime platform 104, and/or a portable electronic device 105 (e.g., handheld device). It will be appreciated that various other communication devices may be included in the communication network 100 so as to communicate with the one or more satellite vehicles 110. The various platforms can be configured to transmit/receive (e.g., via one or more receiver/transmitter/transceiver hardware devices) radio frequency signals to/from various remote sources. The platforms can receive incoming signals (e.g., radio frequency signals such as GNSS/GPS signals) from one or more satellite vehicles 110 along various lines of sight. The platforms can receive signals from other platforms; for example, as shown in FIG. 1, the airborne platform 101 is configured to receive signals from remote sources, such as the ground-based platform 102 (e.g., a ground station) and from one or more remote airborne platforms 106. The lines of sight to the various remote sources may overlap. As the platforms (e.g., airborne platform 101) change in position and/or orientation relative to the remote sources, the platforms may lose or have to reset tracking of the signals. Radio frequency signals may be reflected by various platforms or the ground, complicating tracking of the remote sources. Similarly, in a multi-path environment (not shown), such as an urban environment for communication with portable electronic devices, each signal may be received by the platforms along two or more paths.

The communication network 100 also includes one or more radio frequency interference and/or spoofing sources 120. The radio frequency interference and/or spoofing sources 120 can emit radio frequency signals that interfere with typical transmission and reception of GNSS signals from satellite vehicles 110 and/or spoof GNSS signals of the satellite vehicles 110. In various embodiments, the radio frequency interference and/or spoofing sources 120 can be naturally occurring (e.g., weather, space weather, naturally magnetized materials, and/or the like) or can be devices that interfere (intentionally or unintentionally) with radio frequency signals (e.g., cell phone towers, radio masts/towers, signal jammers, signal spoofers, signal blockers, and/or the like). The radio frequency interference and/or spoofing sources 120 may jam, block, spoof, or otherwise interfere with the reception of GNSS signals from satellite vehicles 110. For example, the radio frequency interference and/or spoofing sources 120 may emit radio frequency signals that cause matched spectrum, multiple narrow band, partial band, swept jamming interference, and/or the like. In another example, the radio frequency interference and/or spoofing sources 120 may emit radio frequency signals that spoof GNSS/GPS signals by masquerading as the GNSS/GPS signals. In this case, the spoofed GNSS/GPS signals may not be recognized as signal interference per se, but may instead be falsely recognized as a GNSS/GPS signal that includes inaccurate navigation data or positioning information. The radio frequency signals emitted by the radio frequency interference and/or spoofing sources 120 can cause loss of signal tracking, degraded tracking, inaccurate location determination, and/or the like, resulting in GNSS calculations with less or no accuracy, debilitating the ability of various entities (e.g., platforms 101-104, portable electronic device 105) to successfully perform navigation and/or targeting operations.

Figure 2:
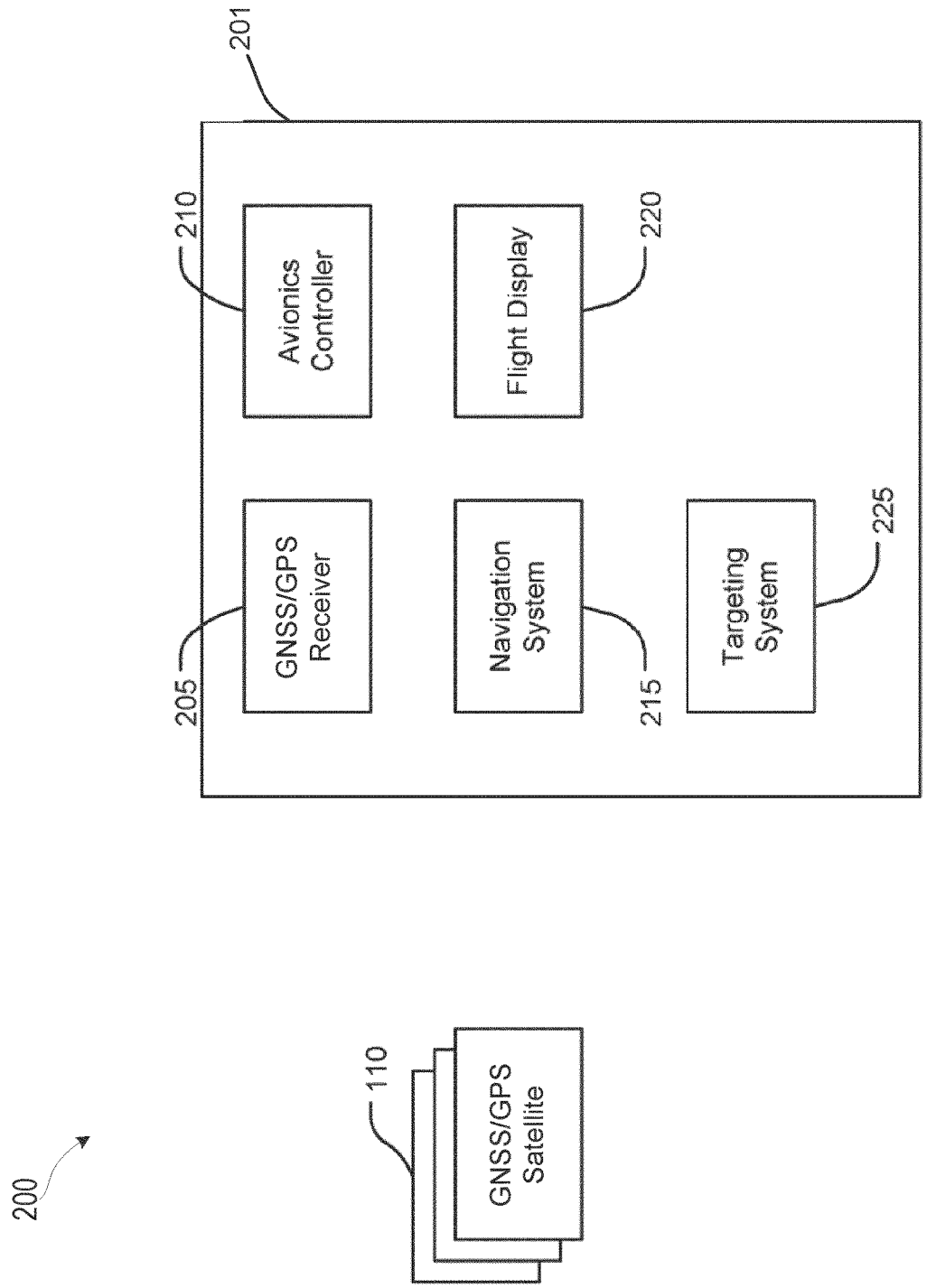
FIG. 2 is a block diagram of a system for GNSS communications, according to an embodiment.

Referring now to FIG. 2, a block diagram of a system 200 is shown according to an exemplary embodiment of the present disclosure. The system 200 can be configured to calculate a range to one or more satellite vehicles 110 (e.g., GNSS satellite vehicles), such as for determining the location of a vehicle 201 or an electronic device associated with the vehicle 201. In various embodiments, the vehicle 201 can be any suitable vehicle, platform, or device that uses GNSS/GPS based location tracking. For example, the vehicle 201 can be the airborne platform 101, the ground-based (e.g., stationary) platform 102 (e.g., a ground station), the mobile ground platform 103, the maritime platform 104, the portable electronic device 105 (e.g., handheld device) described with reference to FIG. 1, and/or any other suitable vehicle, platform, or device. For convenience, the vehicle 201 will be described in the context of the airborne platform 101. In this case, the vehicle 201 includes a GPS/GNSS receiver 205, an avionics controller 210, a navigation system 215, a flight display 220, and a targeting system 225. However, the present disclosure is not limited thereto, and as noted above, the inventive concepts disclosed herein may be implemented in various platforms including ground-based platforms or portable electronic devices. For example, the avionics controller 210 in various embodiments may be configured as a controller specific to the platform implemented on the vehicle 201, and/or one or more component shown in FIG. 2 can be omitted or variously modified depending on the type of vehicle, platform, or device.

One or more components of the vehicle 201 (e.g., GNSS receiver 205, avionics controller 210) may include a processing circuit. The processing circuit (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

In some embodiments, the GNSS receiver 205 is configured to receive incoming signals including radio frequency satellite signals from the one or more satellite vehicles 110. The GNSS receiver 205 can include one or more antennas configured to receive radio frequency signals. The GNSS receiver 205 can be configured to execute computational processes on the received radio frequency signals, including determining a location associated with the GNSS receiver 205 based on processing one or more received radio frequency signals. The GNSS receiver 205 can execute signal tracking channels which correlate the received radio frequency signals to predetermined code signals in order to calculate pseudorange values (e.g., code position measurements, carrier phase measurements, and/or the like) corresponding to each satellite vehicle 110. The GNSS receiver 205 can be configured to generate and output position data regarding the determined location associated with the GNSS receiver 205 using the pseudorange values.

In some embodiments, the GNSS receiver 205 is configured to detect interference (e.g., RF interference) on the received radio frequency signals. In some embodiments, the GNSS receiver 205 is configured to echo, transmit, or otherwise broadcast (e.g., via a transmitter) the detection of the interference in detection data. In some embodiments, the GNSS receiver 205 is configured to detect a spoofed signal on the received radio frequency signals. In some embodiments, the GNSS receiver 205 is configured to echo, transmit, or otherwise broadcast (e.g., via a transmitter) the detection of the spoofed signal in the detection data. In some embodiments, the receiver 205 broadcasts the detection data using automatic dependent surveillance broadcast (ADS-B), but the present disclosure is not limited thereto. For example, in various other embodiments, the receiver 205 can transmit or broadcast the detection of the interference and/or spoofing via very high frequency (VHF) datalink, satellite communications (SATCOM) datalink, and/or any other suitable communication methods, protocols, and/or the like.

For example, in some embodiments, in response to detecting the interference and/or the spoofed signal, the GNSS receiver 205 is configured to generate detection data, which may include a start time of when the interference and/or spoofed signal is detected and the last known position calculated from a reliable source (e.g., the last know position that is calculated prior to the detection of the interference and/or spoofed signal). In some embodiments, the receiver 205 is configured to calculate or estimate a current position based on the last known position and other reliable data (e.g., heading data, speed data, accelerometer data, and/or the like) from other reliable sources (e.g., an Inertial Navigation System INS, an Inertial Reference System IRS, and/or the like) to include in the detection data. In some embodiments, the GNSS receiver 205 is configured to include an end time in the detection data of when the interference and/or spoofed signal is no longer detected, as well as a corresponding current position (e.g., calculated based on a reliable satellite signal).

In some embodiments, the GNSS receiver 205 is configured to cause the display of one or more indicators on one or more display devices associated with the GNSS receiver 205 (e.g., a pilot display, weather display, radar display, and/or the like) indicating the detection of the interference and/or spoofed signal. In some embodiments, the GNSS receiver 205 is configured to receive detection data from one or more other platforms (e.g., other vehicles, ground stations, and/or the like), to generate one or more visual indicators of the detection data. For example, in some embodiments, the GNSS receiver 205 may case the display of a light, icon, and/or the like, indicating the detection of interference and/or spoofing. In some embodiments, the GNSS receiver 205 may generate a virtual geofence around the areas corresponding to the detection data, and may cause display of the virtual geofence (e.g., on a pilot display, radar display, ground station display, and/or the like). In some embodiments, the detection data may be used to identify a location or a source of the interference or spoofed signal (e.g., via triangulation). The GNSS receiver 205 can execute various functions according to the inventive concepts disclosed herein (e.g., as described in more detail with reference to receiver device 405 of FIG. 4) to improve the real-time monitoring and reporting of interference and/or spoofed signals in a more localized (or pinpointed) geographical area.

The avionics controller 210 can be configured to control various components of the airborne platform 101, such as engine control functions, navigation functions, or flight control functions. The avionics controller 210 can be configured to receive the position data from the GNSS receiver 205 and cause the flight display 220 to display information based on the position data. As noted above, in various embodiments, the vehicle 201 may include a controller specific to the airborne platform 101, but the present disclosure is not limited thereto, and in other embodiments, the avionics controller 210 may be omitted or variously modified depending on the type of the platform (or vehicle 201).

The navigation system 215 can use the position data and/or the detection data to execute navigation functions. For example, the navigation system 215 can use the position data and/or the detection data to display a location of the vehicle 201 (which can be an actual location or estimated location depending on the detection of interference and/or spoofing), to update a flight plan, to calculate distances and ranges to remote locations or targets, to calculate state data (e.g., speed, heading), and/or the like.

The flight display 220 (e.g., a pilot display) can include one or more displays. The flight display 220 can be provided in an aircraft cockpit or control center, such as for display to a pilot and/or co-pilot. The flight display 220 can be configured to display flight critical information (e.g., weather information, navigation information, and/or the like). The flight display 220 can be configured to display information based on position data received from the GNSS receiver 205, such as to display a position of the airborne platform 101, as well as a flight plan map which may be displayed along with the position of the airborne platform 101. In some embodiments, the flight display 220 can be configured to display an indicator (e.g., a light, icon, geofence, and/or the like) when interference and/or spoofing is detected. While the one or more display devices is described as the flight display 220 in the context of the vehicle 201 being an airborne vehicle, the present disclosure is not limited thereto, and in various embodiments, the flight display 220 may be one or more display devices that are specific to the vehicle type or platform type. For example, when the platform type is a ground station, the flight display 220 may be one or more display devices associated with the ground station (e.g., air traffic control display device). Various non-limiting example views that may be displayed on the flight display 220 or other suitable displays are described in more detail with reference to FIGS. 5 through 7.

The targeting system 225 can use the position data to calculate targeting parameters. For example, the targeting system 225 can use the position data to calculate a distance to a target, and accordingly calculate a desired targeting trajectory to the target. In some embodiments, when interference and/or spoofing is detected, the targeting system 225 can use the estimated current position to adjust the distance to the target and/or the desired targeting trajectory to the target. In various embodiments, the increase in accuracy and/or reduction in error from detecting interference and/or spoofing in real-time provided by the inventive concepts disclosed herein can improve operation of the targeting system 225 by adjusting for potential errors in the position data to improve the accuracy and precision of targeting solutions. However, as discussed above, the present disclosure is not limited thereto, and the targeting system 225 may be omitted depending on the type of vehicle or platform.

Figure 3:
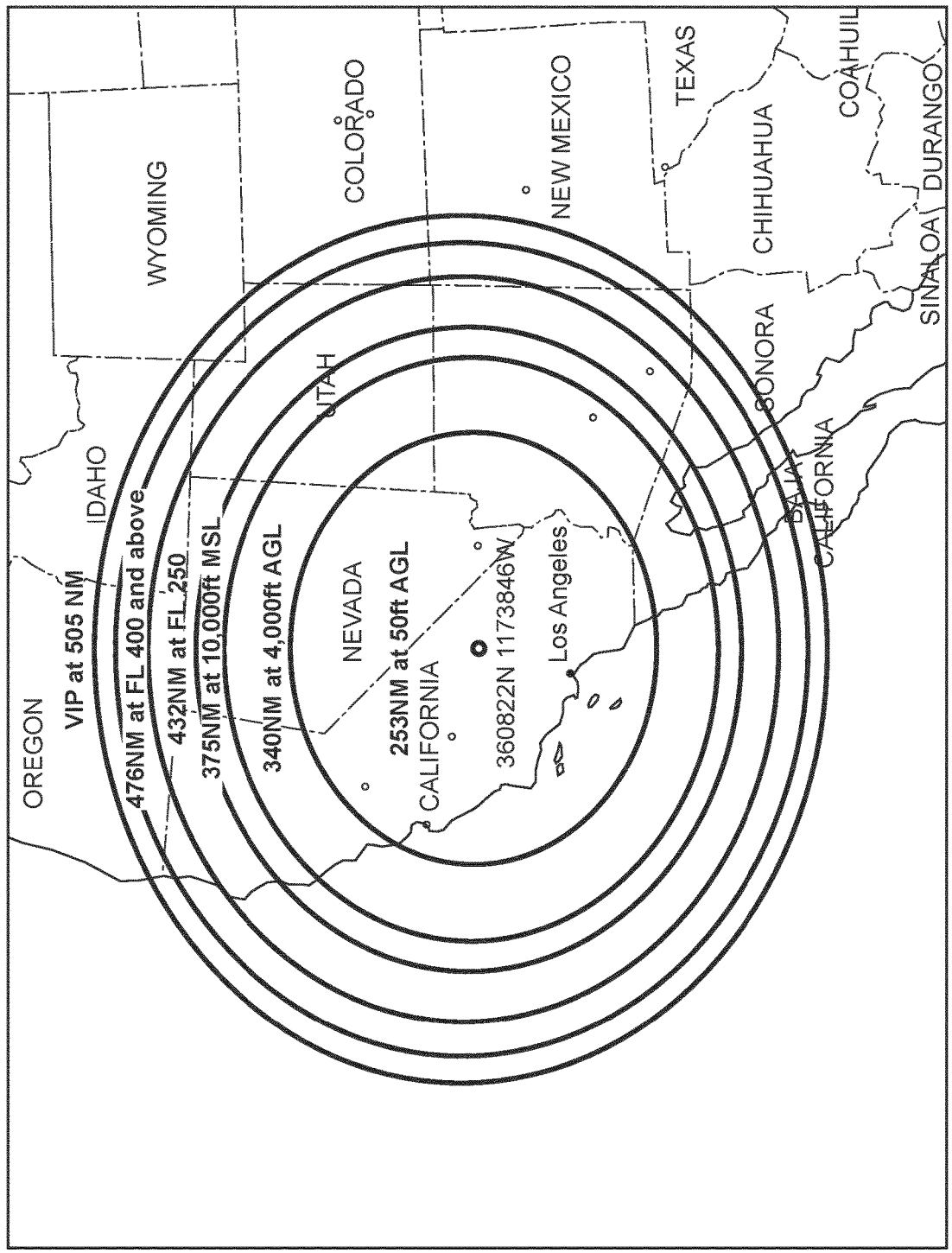
FIG. 3 is a map view corresponding to a notice or advisory of potential GPS outages from a Notice to Airmen (NOTAM) monitoring system, according to a comparative example.

Referring now to FIG. 3, a map corresponding to a notice or advisory of potential GPS outages from a Notice to Airmen (NOTAM) monitoring system is shown, according to a comparative example. Generally, the NOTAM monitoring system distributes unclassified notices or advisories that contain, among other things, information concerning a geographical area that may potentially experience GPS interference or outages during a particular time and date. As shown in FIG. 3, the NOTAM advisory indicates that pilots may experience unreliable or unavailable GPS signals over a large widespread area centered around China Lake, Calif. The NOTAM advisory shows that GPS signals down to 50 ft AGL and over a radius of 253 nautical miles, including most of California and Nevada and parts of Utah and Arizona, could be "unreliable or unavailable." Further, the NOTAM advisory shows that the radius of potential outages expands with altitude, and at 40,000 feet (e.g., FL400), the potential outages or interference may affect a circular area of over 950 nautical miles across, including parts of Oregon, Idaho, Wyoming, Colorado, and New Mexico.

Thus, while the NOTAM provides some advance notice of areas that may experience potential GPS interference or outages, the area covered by the notice is generally too widespread and does not provide any information of where interference was actually reported to be experienced. Thus, the NOTAM does not provide practical information for a pilot or flight crew that may need to traverse the widespread area affected by the potential outage or interference. Further, NOTAMs do not provide any notices or advisories for areas affected by spoofing. On the other hand, as discussed in more detail below, a system for monitoring and reporting, in real-time or near real-time, localized geographical areas or locations where interference and/or spoofed signals are actually detected and reported provides critical information that pilots and flight crews can use to make informed decisions for adjusting (or proceeding with) the current flight plan as needed or desired.

Figure 4:
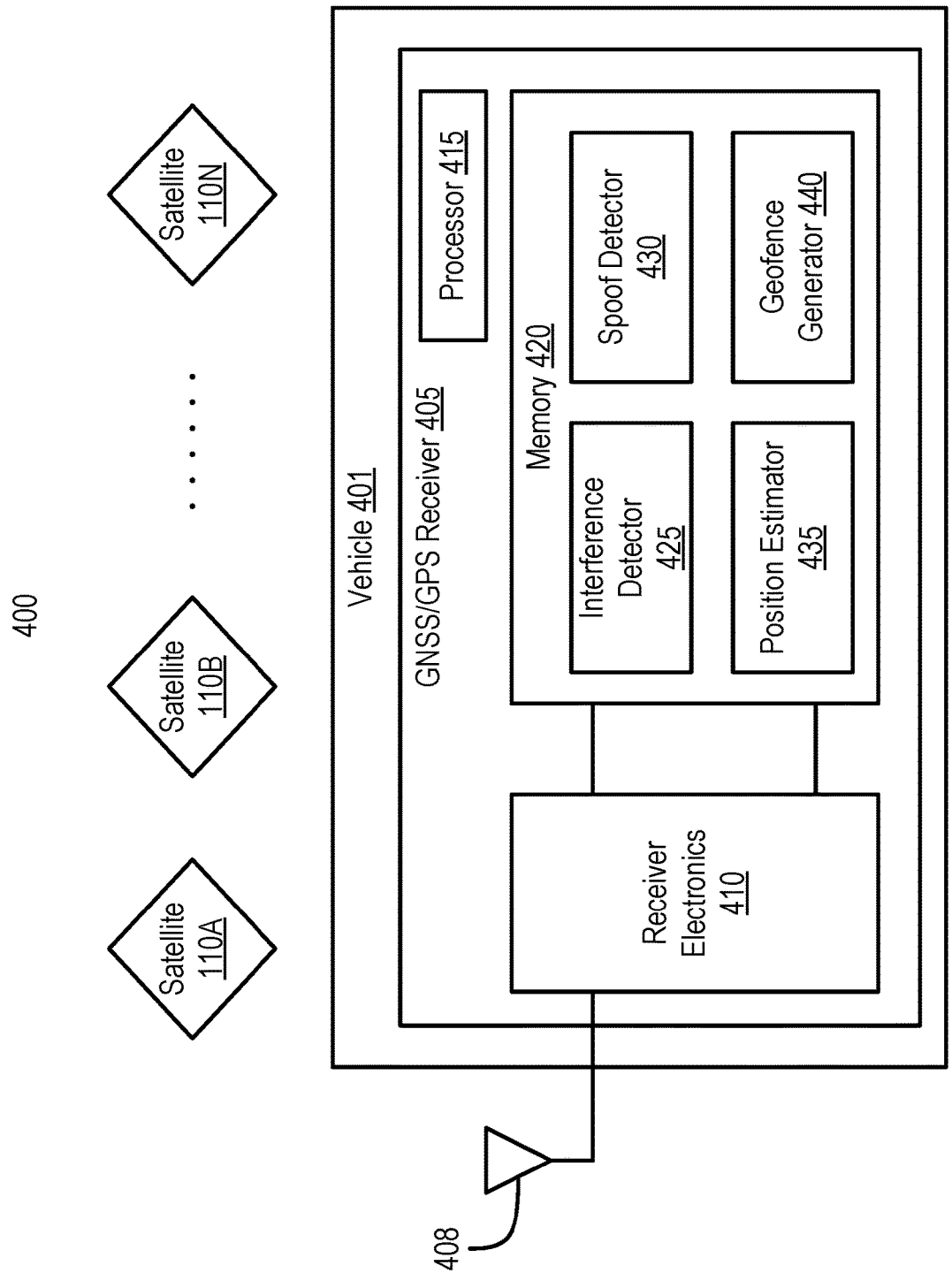
FIG. 4 is a block diagram of an interference monitoring system, according to an embodiment.

Referring now to FIG. 4, a block diagram of an interference monitoring system 400 is shown according to an exemplary embodiment of the inventive concepts disclosed herein. The system 400 can implement features of the system 200 described with reference to FIG. 2 (e.g., the GNSS/GPS receiver 205). For example, the system 400 may include one or more components of system 200 as detailed above, such as the vehicle 401 and the one or more satellite vehicles 110A-N (hereinafter generally referred to as satellite 110). The vehicle 401 can be any suitable vehicle, platform, or device that uses GNSS/GPS based location tracking. For example, the vehicle 401 can be the airborne platform 101, the ground-based (e.g., stationary) platform 102 (e.g., a ground station), the mobile ground platform 103, the maritime platform 104, or the portable electronic device 105 (e.g., handheld device) described with reference to FIG. 1. In some embodiments, the vehicle 401 may include or may be installed with a radio frequency antenna 408 and a GNSS/GPS receiver 405.

In accordance with GNSS protocols, each satellite 110 may transmit or broadcast a signal (e.g., radio frequency signals such as GNSS/GPS signals). The signal may have a carrier frequency, a wavelength, an encoding, and a modulation, among other characteristics as specified by the GNSS protocol. The carrier frequencies may be a multiple of a fundamental frequency set by the GNSS protocol. In some embodiments, the fundamental frequency may be 10.23 MHz. The messages encoded in the signal may include a status message and ephemeris data. The ephemeris data may indicate a position of the satellite 110 in orbit around the Earth. In some embodiments, the signal transmitted by the satellite 110 may be an L1 GPS signal, and may have a carrier frequency of 1575.42 MHz (10.23 MHz×154) and a wavelength of 19.0 cm. In some embodiments, the signal transmitted by the satellite 110 may be a L2 GPS signal, and may have a carrier frequency of 1227.60 MHz (10.23 MHz×120) and a wavelength of 24.4 cm. In some embodiments, the signal transmitted by the satellite 110 may be, for example, a L5 GPS signal having a carrier frequency of 1176.45 MHz (10.23 MHz×115) and a wavelength of 25.48 cm. However, in other embodiments, the signal may be any suitable GNSS/GPS signal transmitted or otherwise broadcast by the satellite 110.

The antenna 408 may receive the one or more signals from the one or more corresponding satellites 110 within range (or view) of the antenna 408. The antenna 408 may be mounted on the vehicle 401, and in some embodiments, the antenna 408 may include a plurality of antennas (e.g., dual antennas) that are separated by a baseline length. In some embodiments, the antenna 408 may be a half-wave dipole, a dipole antenna (e.g., corner reflector or log-periodic), a monopole antenna (e.g., whip, mast, umbrella, or inverted F), a travelling wave antenna (e.g., helical or spiral), reflector antenna (e.g., corner or parabolic), an aperture antenna (e.g., parabolic, slot, horn, or dielectric), a microstrip antenna, an array antenna (e.g., phased array antenna, electronically scanned array (ESA) with a phase shifter, collinear array, planar array, and conformal array), a loop antenna, and/or the like, or any suitable combination thereof.

From the antenna 408, the GNSS/GPS receiver 405 may obtain pseudorange measurements and carrier phase measurements for the one or more satellites 110 within the range (or view) of the antenna 408. The pseudorange measurement may be an approximated distance from the antenna 408 to the satellite 110 corresponding to the received signal. The carrier phase measurement may be a number of cycles in the signal between the antenna 408 and the satellite 110 corresponding to the received signal. In some embodiments, the pseudorange measurements and carrier phase measurements may be obtained by the GNSS/GPS receiver 405 at measurement epochs. The measurement epoch may be a sampling interval for obtaining the pseudorange measurements and carrier phase measurements of the signals of the satellites 110 within the range received via the antenna 408. In some embodiments, the sampling interval may range from a few hundredths of a second to hours. In some embodiments, the GNSS/GPS receiver 405 may calculate, determine, or otherwise obtain the pseudorange measurements and carrier phase measurements based on the received signals from the one or more satellites 110. In some embodiments, the received signals may have a single carrier frequency. In some embodiments, the received signals may have dual or multiple carrier frequencies.

The receiver 405 includes receiver electronics 410, one or more processors 415, and memory 420. The processors 415 may be configured to execute computer code and/or program instructions stored in the memory 420 or received from other computer readable media (e.g., CDROM, network storage, a remote server, etc.). The processors 415 can be implemented on one or more processing circuits using various electronic components similar to those described with reference to FIG. 2. For example, in some embodiments, the processors 415 may include a microprocessor unit, an application-specific integrated circuit (ASIC), and/or a field-programmable gate array (FPGA), among others. The processors 415 may also be a multi-core processor or an array of processors. The memory 420 may include electronic, optical, magnetic, or any other storage device capable of relaying or providing the processor with program instructions. The memory 420 may include, for example, a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programing language, such as C, C++, C#, Java, JavaScript, Perl, HTML, XML, Python, Visual Basic, et cetera, or any combination thereof. The processors 415 and components thereof can execute the functions described herein (e.g., detecting RF interference, detecting spoofing, broadcasting the detected interference and/or spoofing, and the like).

The receiver electronics 410 can include or be coupled to the antenna 408 which receives the incoming radio frequency signals. The antenna 408 can receive incoming radio frequency signals which include satellite vehicle signals from one or more satellite vehicles 110, and which may or may not include interference and/or spoofing signals. For example, the incoming radio frequency signals can include signals transmitted from a plurality of the satellite vehicles 110 and/or from one or more interference and/or spoofing sources 120 as illustrated in FIG. 1. The radio frequency antenna 408 can generate radio frequency data (e.g., an electrical or optical signal encoding the radio frequency data) based on the incoming radio frequency signals. The radio frequency data can include (e.g., encode) signals from one or more satellite vehicles 110 and/or from one or more interference and/or spoofing sources 120. In some embodiments, the receiver electronics 410 can amplify and/or filter the radio frequency signals. In some embodiments, the receiver electronics 410 can down covert the radio frequency signals, which can allow for more efficient processing by the processors 410. In some embodiments, the receiver electronics 410 can receive and process incoming radio frequency signals including satellite signals on multiple frequencies or bands (e.g., L1 signal, L2 signal, L5 signal, and/or the like).

In some embodiments, the receiver 405 transmits or otherwise broadcasts (e.g., periodically or upon request) location data corresponding to its position (e.g., latitude, longitude, and altitude) based on the navigation data from the received signals, as well as a time of the position calculation or a time of the broadcast. In various embodiments, the receiver 405 detects interference on the received signal and/or spoofing of a GNSS signal. In some embodiments, the receiver 405 estimates a current position based on a last known position in response to detecting the interference and/or spoofing. In some embodiments, the receiver 405 echos, transmits, or otherwise broadcasts periodically, upon request, and/or in response to detecting the interference and/or spoofing, its estimated current position along with an indication that the interference and/or spoofing has been detected. For example, in some embodiments, when the receiver 405 detects interference and/or spoofing, the receiver transmits or otherwise broadcasts detection data in lieu of (or in addition to) the location data. The detection data may indicate that the interference and/or spoofing has been detected, the time of the detection and/or broadcast, and the estimated current position (e.g., based, at least in part, on the last known position). In various embodiments, the receiver 406 transmits or broadcasts the detection data via ADS-B, VHF datalink, SATCOM datalink, and/or any suitable communication methods, protocols, or the like.

Still referring to FIG. 4, in some embodiments, the receiver 405 includes an interference detector 425, a spoof detector 430, a position estimator 435, and a geofence generator 440. While FIG. 4 shows that the interference detector 425, the spoof detector 430, the position estimator 435, and the geofence generator 440 are each a part of the receiver 405, the present disclosure is not limited thereto, and each of these modules and components may be a part of the receiver 405 or may be separate from the receiver 405. For example, in some embodiments, the position estimator 435 may be a part of the navigation system 215 and/or the geofence generator 440 may be a part of the flight display 220.

In some embodiments, the interference detector 425 detects interference (e.g., RF interference) on the incoming signal. For example, in various embodiments, the interference detector 425 detects interference by monitoring the receiver's Automatic Gain Control (AGC) loop, monitoring the carrier to noise density ratio (C/No) of the tracked satellite (or satellites), performing power spectrum measurements of raw analog-to-digital (A-D) samples, monitoring the receiver's acquisition engine filter, or using any other suitable methods or combinations thereof to detect interference. In some embodiments, the interference detector 425 updates a parameter (e.g., a flag) or data bit indicating the detection of the interference when the RF interference is detected (or no longer detected).

In some embodiments, the spoof detector 430 detects spoofing on the incoming signal. For example, in various embodiments, the spoof detector 430 detects a spoofed signal by analyzing the angle of arrival, comparing positions computed using different satellite constellations, comparing position information with another source (e.g., an Inertial Navigation System, an Inertial Reference System, and/or the like), detecting multiple correlation peaks on the tracked signal, or using any suitable methods or combinations thereof to detect spoofing. In some embodiments, the spoof detector 425 updates a parameter (e.g., a flag) or data bit indicating the detection of a spoofed signal when the spoofed signal is detected (or no longer detected). In some embodiments, the parameter or data bit for the spoof detector 425 may be different from that of the interference detector 425.

In some embodiments, the position estimator 435 estimates a current position of the vehicle 401 in response to detecting the interference or the spoofed satellite signal. For example, by virtue of the interference or the spoofed satellite signal, the current position of the vehicle 401 cannot be accurately determined from the navigation data on the incoming signal. Thus, the position estimator 435 estimates the current position of the vehicle 401 irrespective of what the navigation data may indicate on the received signal. In this case, in some embodiments, the position estimator 435 estimates the current position based on a last known position of the vehicle 401, for example, at a last time when the position data was calculated based on a reliable satellite signal. For example, in some embodiments, the position estimator 435 may estimate the current position from the last known position, a heading direction, speed, various sensor or other source readings, and/or the like.

In some embodiments, the geofence generator 440 may generate a virtual geofence around areas corresponding to one or more locations where the interference and/or the spoofed signals have been detected. In some embodiments, the geofence generator 440 may dynamically adjust the virtual geofence as more locations are identified where interference and/or spoofing is detected. In some embodiments, the receiver 405 (or other associated device such as a digital radio) may receive detection data from one or more other sources (e.g., other aircrafts, ground stations, and/or the like), and may dynamically generate and/or adjust the geofence based on the detection data (e.g., detected and/or received). In some embodiments, the generated geofence may be displayed on one or more display devices (e.g., pilot display, radar display, ground controls display, and/or the like) as an indicator of the detected interference and/or spoofing.

Figure 5:
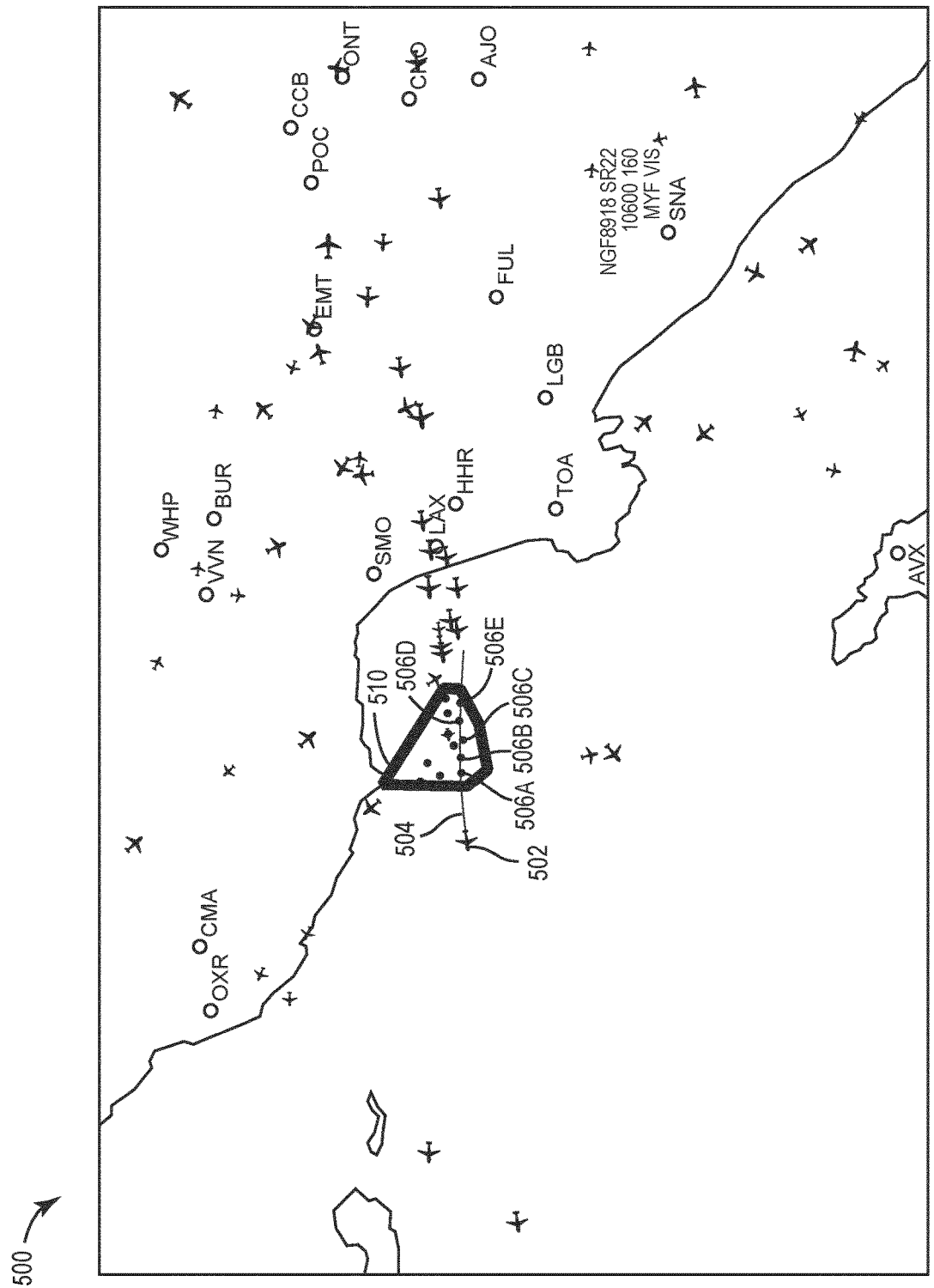
FIG. 5 is a view of an air traffic control display, according to an embodiment.

For example, referring to FIG. 5, a view of an air traffic control display 500 is shown, according to an exemplary embodiment. As shown in FIG. 5, in some embodiments, a receiver (e.g., the GNSS/GPS receiver 405, a digital radio, and/or the like) of an air traffic control ground station may receive broadcasts from a plurality of vehicles (e.g., such as the vehicle 401 shown in FIG. 4) traveling along their corresponding paths. As the plurality of vehicles traverse along their corresponding paths, the vehicles periodically (e.g., at predetermined intervals) broadcast position or location data including their current position and time of the broadcast or position determination. When the vehicles detect interference and/or spoofing along their corresponding paths, the vehicles periodically (e.g., at predetermined intervals) broadcast detection data in addition to (or in lieu of) the position data.

For example, as shown in the non-limiting example of FIG. 5, as a vehicle 502 (e.g., an aircraft in this case) travels along a path 504, the vehicle 502 broadcasts its position or location data periodically along the path 504. As the vehicle 502 detects interference and/or spoofing at various points 506 (e.g., 506A-506E) along the path 504, the vehicle 502 transmits detection data at the various points 506 along the path 504. In some embodiments, the detection data includes one or more parameters or flags indicating the detection of interference and/or spoofing (e.g., a detection parameter), an estimated current position based, at least in part, on a last known position, and a time of the broadcast and/or detection (e.g., start time or end time).

For example, at a first point 506E along the path 504 that the vehicle 502 (e.g., the GNSS receiver of the vehicle 502) detects interference and/or spoofing, the vehicle 502 generates detection data, and broadcasts the detection data to be received by the air traffic control ground station. The detection data corresponding to the first point 506E includes the detection parameter, an estimated current position, and a time of the transmission or current position calculation. In this case, the estimated current position is calculated based on a last known position (e.g., the last location data calculated based on a reliable satellite signal) and other data (e.g., speed, heading, sensor readings, and/or the like). At a second point 506D along the path 504, the vehicle 502 continues to detect (or again detects) interference and/or spoofing. Thus, the vehicle 502 generates detection data, and broadcasts the detection data to be received by the air traffic control ground station. The detection data corresponding to the second point 506D includes the detection parameter, an estimated current position, and a time of the transmission or current position calculation. In this case, the estimated current position of the second point 506D may be calculated based on the last known position (e.g., the last location data calculated based on a reliable satellite signal) and other data (e.g., speed, heading, sensor readings, and/or the like), or may be calculated based on the estimated current position of the first point 506E and the other data (e.g., speed, heading, sensor readings, and/or the like). Similarly, the vehicle 502 generates and broadcasts detection data for each of the other remaining points 506C, 506B, and 506A where interference and/or spoofing is detected.

On the other hand, once the vehicle 502 no longer detects interference and/or spoofing, the vehicle 502 continues to periodically generate and broadcast the position or location data as describe above. For example, at some point along the path 504 past the point 506A, the vehicle 502 no longer detects interference and/or spoofing. In this case, the vehicle 502 periodically generates and transmits the position data as is normally the case. In some embodiments, the position data may include an end time of when the interference and/or spoofing is no longer detected. In this way, the receiver (e.g., the geofence generator 440) of the air traffic control ground station receives and tracks the locations where interference and/or spoofing is detected from a plurality of vehicles, and generates a virtual geofence 510 surrounding one or more locations of the detected interference and/or spoofing. The virtual geofence 510 may be displayed on the air traffic control display 500, and may be used, for example, to warn other aircrafts traversing the area of the potential interference and/or spoofing locations, vector aircrafts around the interference, generate automatic pilot reports (PIREPs) or PIREP-like information, generate more accurate GPS related NOTAMs, and/or the like.

Figure 6:
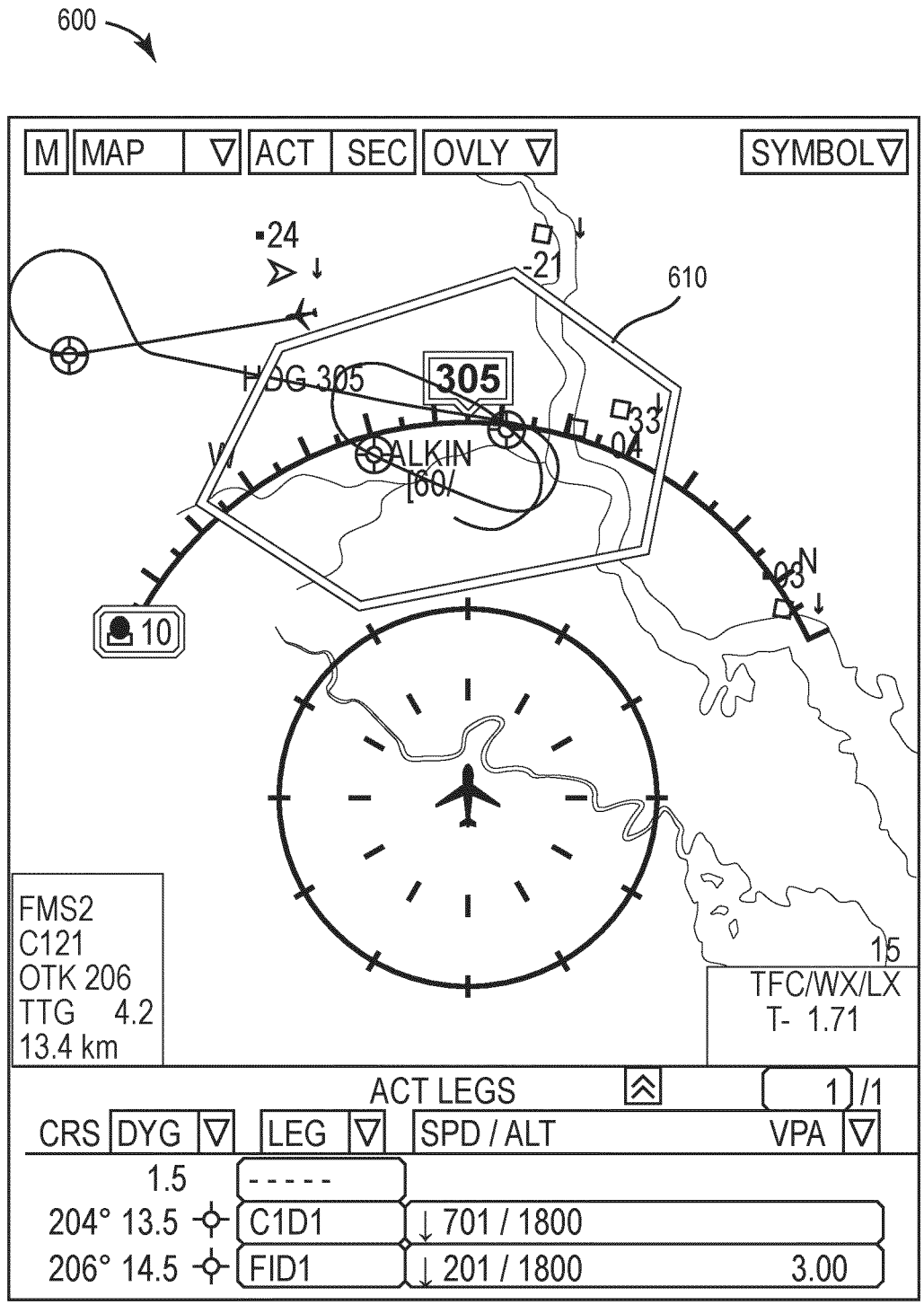
FIG. 6 is a view of a pilot display device, according to an embodiment.

Referring now to FIG. 6, a view of a pilot display device is shown, according to an exemplary embodiment. As shown in FIG. 6, the view of the pilot display device 600 may display a geofence 610 of an area where interference and/or spoofing was detected, similar to or within the display of weather radar. In this case, similar to weather radar, the flight crew can decide if the interference and/or spoofing will affect their operations, fly through the area knowing that GPS may be affected, fly around or avoid the area, select a non-GPS approach (e.g., if interference and/or spoofing is detected during approach), and/or the like. While FIG. 6 shows one geofence 610 for indicating the locations where the interference and/or spoofing is detected, the present disclosure is not limited thereto, and it should be appreciated that different geofences may be generated and displayed depending on the detection of interference or the detection of spoofing. For example, in some embodiments, a geofence for interference may be generated and a separate geofence for spoofing may be generated. In some embodiments, the geofence for interference and the geofence for spoofing may have different attributes for identification purposes. For example, in some embodiments, the geofence for interference may be generated and/or displayed in a different color than that of the geofence for spoofing.

Figure 7:
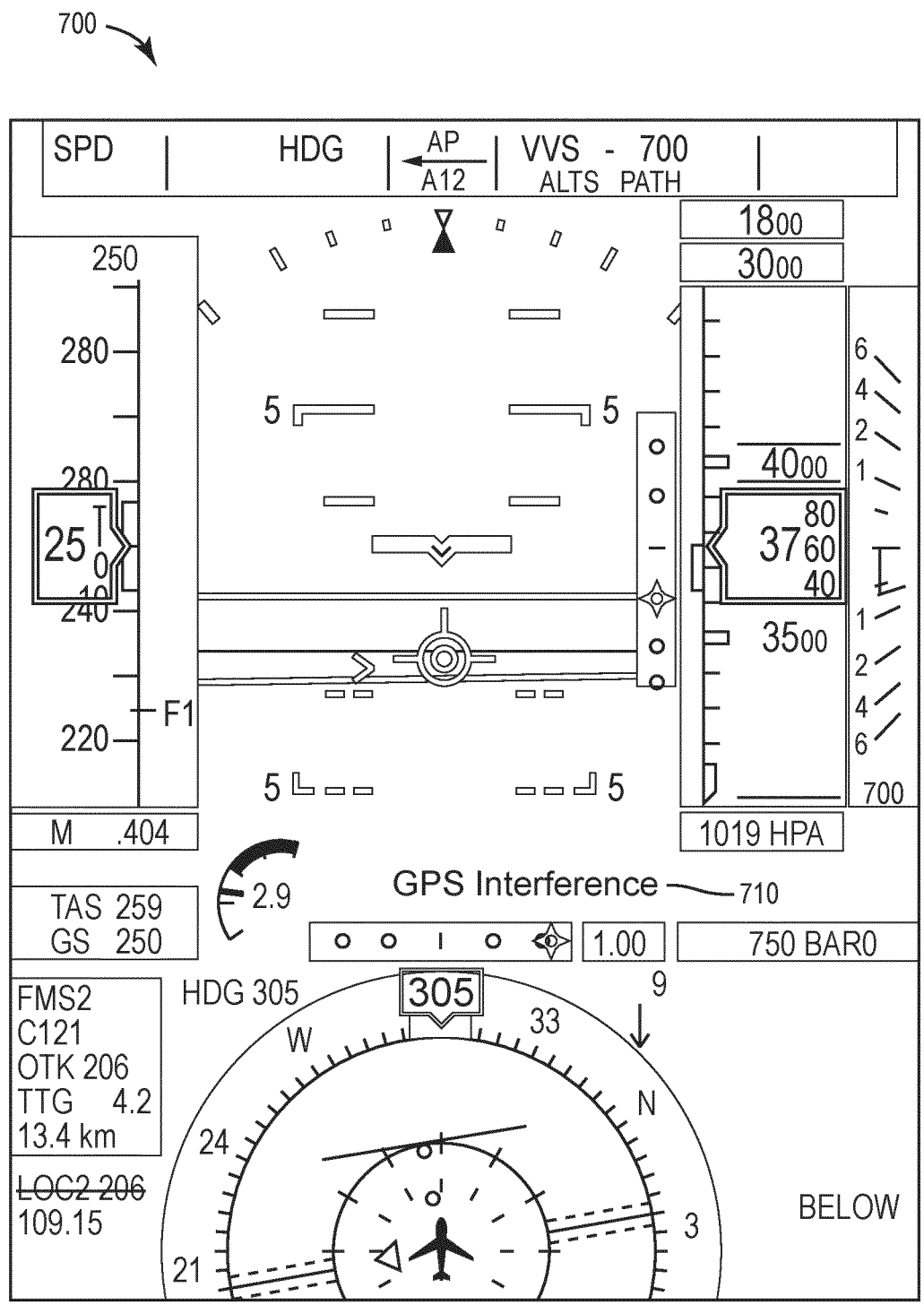
FIG. 7 is a view of a pilot display device, according to an embodiment.

Referring now to FIG. 7, a view of a pilot display device is shown, according to an exemplary embodiment. As shown in FIG. 6, the view of the pilot display 700 may include one or more indicators 700 that is displayed when interference and/or spoofing is detected. Thus, the pilot may be informed in real-time (or near real-time) whenever interference and/or spoofing is currently being detected, so that the pilot can quickly make informed decisions to adapt to the challenges that may be presented by the interference and/or spoofing. While FIG. 7 shows one indicator 710 for indicating the presence of GPS interference, the present disclosure is not limited thereto, and it should be appreciated that a different indicator may be used for indicating the presence of spoofing. Further, in some embodiments, the indicator for interference and the indicator for spoofing may have different attributes for identification purposes. For example, in some embodiments, the indicator for interference may be displayed in a different color than that of the indicator for spoofing.

While various non-limiting example embodiments are described in the context of displaying an indication of the detected interference and/or spoofing, the present disclosure is not limited thereto, and it should be appreciated that the detection data generated and broadcast by one or more platforms may be used for various applications. For example, in some embodiments, the detection data may be collected and tracked to determine or isolate a location or source of intentional or unintentional GPS interference and/or spoofing. For example, in some embodiments, the Federal Communications Commission (FCC), Federal Aviation Administration FAA, military, or other authorities can use the real-time detection data to identify a location or source of the interference and/or spoofing. Accordingly, there are various different applications and use cases in which the real-time detection and monitoring of interference and/or spoofing according to various embodiments can be applied, all without departing from the spirit and scope of the present disclosure.

Figure 8:
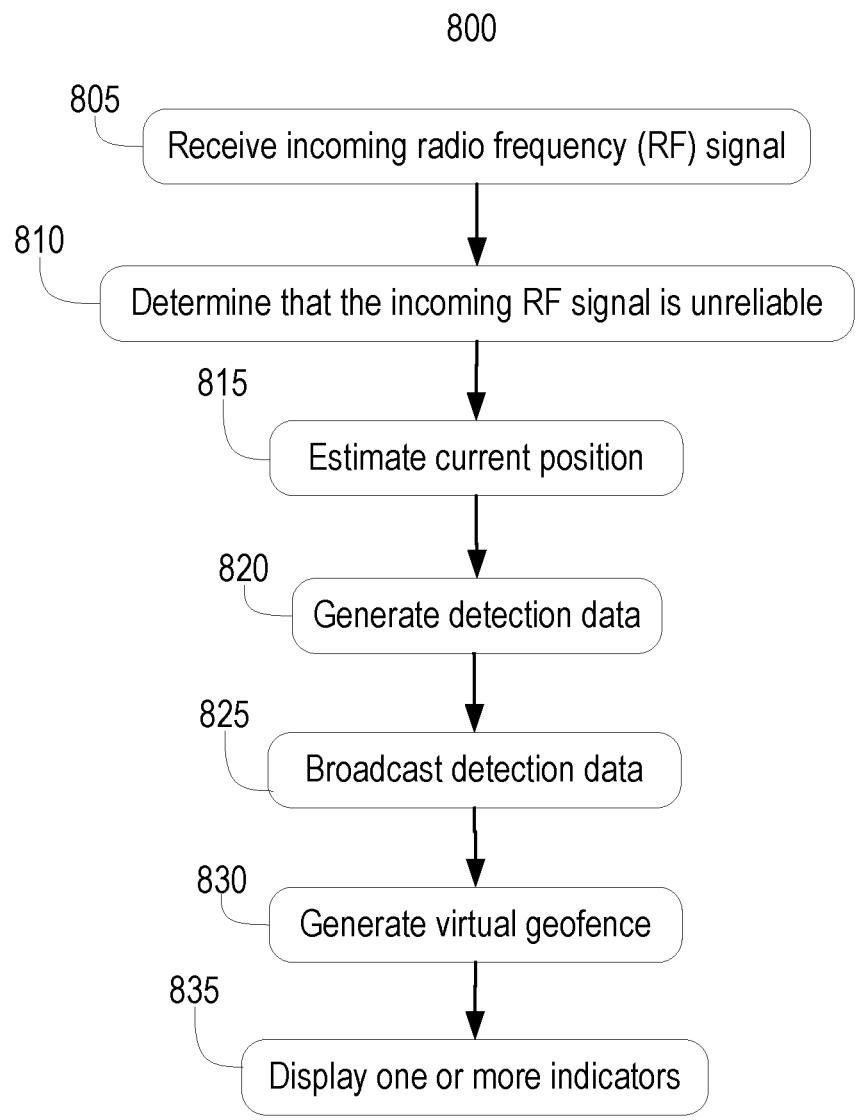
FIG. 8 is a flow diagram of a process for real-time monitoring of interference and/or spoofing, according to an embodiment.

FIG. 8 is a flow diagram of a process for real-time monitoring of interference and/or spoofing, according to an exemplary embodiment. Referring to FIG. 8, the process 800 starts and an incoming radio frequency (RF) signal is received by a receiver device configured to receive an incoming RF satellite signal from a satellite vehicle at block 805. The receiver device may be any one of the receiver device 201 or the receiver device 401 described above with reference to FIGS. 2 and 4, respectively. The incoming RF signal may be an incoming RF satellite signal from a satellite vehicle. In some embodiments, the incoming RF signal may include interference. In some embodiments, the incoming RF signal may include a spoofed RF satellite signal from an interference and/or spoofing source.

In some embodiments, the receiver device determines if the RF signal is unreliable at block 810. For example, in some embodiments, if the receiver device detects interference on the incoming RF signal, the receiver device determines that the RF signal is unreliable. In various embodiments, the receiver device may detect interference by monitoring the receiver's Automatic Gain Control (AGC) loop, monitoring the carrier to noise density ratio (C/No) of the tracked satellite (or satellites), performing power spectrum measurements of raw analog-to-digital (A-D) samples, monitoring the receiver's acquisition engine filter, or using any other suitable methods or combinations thereof to detect interference. In some embodiments, if the receiver devices detects a spoofed RF signal on the incoming RF signal, the receiver device determines that the RF signal is unreliable. In various embodiments, the receiver device may detect the spoofed RF signal by analyzing the angle of arrival, comparing positions computed using different satellite constellations, comparing position information with another source (e.g., an Inertial Navigation System, an Inertial Reference System, and/or the like), detecting multiple correlation peaks on the tracked signal, or using any suitable methods or combinations thereof to detect spoofing.

In some embodiments, the receiver device estimates a current position at block 815. For example, by virtue of the detection of interference or the spoofed signal, the current position cannot be accurately determined from the navigation data on the incoming RF signal. Thus, in some embodiments, in response to detecting that the incoming RF signal is unreliable (e.g., by detecting interference and/or spoofing), the receiver device estimates the current position based, at least in part, on a last known position when the location was calculated based on a reliable satellite signal (e.g., when the interference and/or the spoofing was not detected). For example, in some embodiments, the receiver device estimates the current position based on the last known position and data from one or more reliable sources (e.g., a heading direction, speed, various sensor or other source readings, and/or the like).

In some embodiments, the receiver device generates detection data at block 820, and broadcasts the detection data at block 825. The detection data my include, for example, one or more parameters or data bits indicating the detection of interference and/or spoofing, data corresponding to the estimated current position, and a time (e.g., start time or end time) of the current position estimate or of the broadcast. In various embodiments, the detection data may be broadcast via ADS-B, VHF datalink, SATCOM datalink, and/or any suitable communication methods, protocols, or the like. In some embodiments, the broadcast may be received by one or more other vehicles, platforms, or devices, for example, such as other aircrafts, ground stations (e.g., air traffic control), monitoring systems (e.g., NOTAM), and/or the like. In some embodiments, the one or more other vehicles, platforms, or devices may use the received detection data to perform suitable actions (e.g., display a geofence around the areas identified by the detection data (e.g., from the estimated current positions), isolate or identify a location or source of the interference and/or spoofing, and/or the like). In some embodiments, the receiver device may transmit the detection data to other components within the vehicle, such as the flight display, navigation system, and/or the like. For example, in some embodiments, the flight display may use the detection data to display one or more notifications thereon (e.g., lights, icons, and/or the like).

In some embodiments, the receiver device generates a virtual geofence at block 830. For example, in some embodiments, the receiver device generates the virtual geofence around the current position estimates calculated each time the interference and/or spoofing was detected in a corresponding area. In some embodiments, the receiver device may receive detection data from one or more other sources (e.g., other vehicles, platforms, or devices), such as other aircrafts, and may generate and/or adjust the virtual geofence to encompass the areas identified in the detection data. While it is described that the receiver device generates the virtual geofence, the present disclosure is not limited thereto, and in other embodiments, the virtual geofence may be generated by other components or modules of the vehicle (e.g., the navigation system) based on the current position estimates in the detection data.

In some embodiments, one or more indicators are displayed on a display device coupled to the receiver device at block 835. For example, the receiver device may cause the one or more indicators to be displayed on a display device coupled to the receiver device (e.g., a flight display). In some embodiments, the one or more indicators may be displayed on a display device associated with one or more other vehicles, platforms, or devices that receive the detection data (e.g., air traffic control ground station, other aircrafts, and/or the like). In some embodiments, the one or more indicators may simply be a light, icon, or other type of indicator that is displayed on the display device. In some embodiments, the one or more indicators may include the virtual geofence.

As will be appreciated from the above, systems and methods for real-time monitoring of interference and/or spoofing according to various embodiments of the inventive concepts disclosed herein may improve monitoring systems, operation of aircraft, other platforms, GNSS receiver electronics, and portable electronics devices by providing real-time reporting of interference and/or spoofing that can be used to identify and correct potential errors in navigation, even while experiencing the interference and/or spoofing. In some embodiments, detection data generated by the systems and methods discussed herein can be used for real-time or near-real time notifications to flight crews, air traffic controls, other vehicles or platforms, determine a location or source of the interference and/or spoofing, and/or the like. As such, the inventive concepts disclosed herein can improve GNSS signal processing technology and/or monitoring systems, leading to more accurate/reliable position determination, navigation, and targeting operations.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system comprising:
a display device; and
a receiver device configured to receive an incoming radio frequency (RF) satellite signal from a satellite vehicle, the receiver device comprising:
a processor; and
computer-readable storage media communicably coupled to the processor having instructions stored thereon that, when executed by the processor, cause the processor to:

receive an incoming RF signal;
detect spoofing on the incoming RF signal;
determine that the incoming RF signal is unreliable in response to detecting the spoofing on the incoming RF signal;
generate detection data in response to detecting that the incoming RF signal is unreliable, wherein the detection data includes a spoofing parameter indicating that the spoofing is detected;
detect interference on the incoming RF signal, wherein the incoming RF signal is determined to be unreliable in response to detecting the interference on the incoming RF signal;
update an interference parameter for the detection data in response to detecting the interference, wherein the interference parameter indicates that the interference is detected;
generate a first virtual geofence for spoofing to surround an area corresponding to the spoofing parameter;
generate a second virtual geofence for interference to surround an area corresponding to the interference parameter;
display the first virtual geofence for spoofing and the second virtual geofence for interference on the display device, wherein the first virtual geofence for spoofing is displayed in a different color than the second virtual geofence for interference, wherein the display device is a pilot display or an air traffic control display that is configured to display the first virtual geofence for spoofing and the second virtual geofence for interference; and
broadcast the detection data.

2. The system of claim 1, wherein the current position is estimated based on a last known position calculated based on a reliable incoming satellite signal.

3. The system of claim 1, wherein the display device is configured to display an indicator indicating that the incoming RF signal is unreliable.

4. The system of claim 1, wherein the instructions further cause the processor to:
estimate a current position; and
update current position information for the detection data based on the estimated current position.

5. The system of claim 3, wherein the indicator is one or more lights indicating detection of interference and/or spoofing on the incoming RF signal, and the display device is configured to display the one or more lights in response to the detection of the interference and/or spoofing on the incoming RF signal.

6. The system of claim 1, wherein the instructions further cause the processor to:
receive detection data from one or more other receiver devices; and
adjust the first virtual geofence for spoofing and the second virtual geofence for interference to encompass one or more areas corresponding to the received detection data.

7. A method comprising:
receiving, by a receiver device configured to receive an incoming radio frequency (RF) satellite signal from a satellite vehicle, an incoming RF signal;
detecting spoofing on the incoming RF signal;
determining, by the receiver device, that the incoming RF signal is unreliable in response to detecting the spoofing on the incoming RF signal;
generating, by the receiver device, detection data in response to detecting that the incoming RF signal is unreliable, wherein the detection data includes a spoofing parameter indicating that the spoofing is detected;
detecting interference on the incoming RF signal, wherein the incoming RF signal is determined to be unreliable in response to detecting the interference on the incoming RF signal;
updating an interference parameter for the detection data in response to detecting the interference, wherein the interference parameter indicates that the interference is detected;
generating a first virtual geofence for spoofing to surround an area corresponding to the spoofing parameter;
generating a second virtual geofence for interference to surround an area corresponding to the interference parameter;
displaying the first virtual geofence for spoofing and the second virtual geofence for interference on a display device, wherein the first virtual geofence for spoofing is displayed in a different color than the second virtual geofence for interference, wherein the display device is a pilot display or an air traffic control display that is configured to display the first virtual geofence for spoofing and the second virtual geofence for interference; and
broadcasting, by the receiver device, the detection data.

8. The method of claim 7, further comprising:
estimating, by the receiver device, a current position; and
updating, by the receiver device, current position information for the detection data based on the estimated current position.

9. The method of claim 8, wherein the current position is estimated based on a last known position calculated based on a reliable incoming satellite signal.

10. The method of claim 7, further comprising displaying, by a display device coupled to the receiver device, an indicator indicating that the incoming RF signal is unreliable.

11. The method of claim 10, wherein the indicator is one or more lights indicating detection of interference and/or spoofing on the incoming RF signal, and the display device is configured to display the one or more lights in response to the detection of the interference and/or spoofing on the incoming RF signal.

12. The method of claim 7, further comprising:
receiving, by the receiver device, detection data from one or more other receiver devices; and
adjusting, by the receiver device, the first virtual geofence for spoofing and the second virtual geofence for interference to encompass one or more areas corresponding to the received detection data.

* * * * *